US011064447B2

(12) United States Patent
Bienas et al.

(10) Patent No.: US 11,064,447 B2
(45) Date of Patent: Jul. 13, 2021

(54) SINGLE FREQUENCY NETWORK RANDOM ACCESS

(71) Applicant: IPCom GmbH & Co. KG, Pullach (DE)

(72) Inventors: Maik Bienas, Schoeppenstedt (DE); Andreas Schmidt, Braunschweig (DE); Martin Hans, Bad Salzdetfurth (DE)

(73) Assignee: IPCOM GMBH & CO. KG, Pullach (DE)

(*) Notice: Subject to any disclaimer, the term of this patent is extended or adjusted under 35 U.S.C. 154(b) by 307 days.

(21) Appl. No.: 15/774,323

(22) PCT Filed: Nov. 18, 2016

(86) PCT No.: PCT/EP2016/078169
§ 371 (c)(1),
(2) Date: May 8, 2018

(87) PCT Pub. No.: WO2017/085275
PCT Pub. Date: May 26, 2017

(65) Prior Publication Data
US 2020/0260503 A1 Aug. 13, 2020

(30) Foreign Application Priority Data
Nov. 18, 2015 (EP) .................................... 15195134

(51) Int. Cl.
*H04W 74/08* (2009.01)
*H04W 76/15* (2018.01)
(Continued)

(52) U.S. Cl.
CPC ..... *H04W 56/001* (2013.01); *H04W 56/0055* (2013.01); *H04W 56/0095* (2013.01);
(Continued)

(58) Field of Classification Search
CPC ............. H04W 76/15; H04W 74/0833; H04W 72/1278; H04W 74/0891; H04W 74/0841; H04J 13/0006
See application file for complete search history.

(56) References Cited

U.S. PATENT DOCUMENTS

2013/0170385 A1   7/2013  Frenger et al.
2016/0262161 A1*  9/2016  Li ........................ H04L 5/0051
(Continued)

FOREIGN PATENT DOCUMENTS

EP         2448340 A1      5/2012
JP       2012531128 A     12/2012
(Continued)

OTHER PUBLICATIONS

International Search Report and Written Opinion of International Application No. PCT/EP20166/078169, dated Feb. 16, 2017.
(Continued)

*Primary Examiner* — Omer S Mian
(74) *Attorney, Agent, or Firm* — Marshall, Gerstein & Borun LLP

(57) ABSTRACT

A method for controlling access to a radio channel in a single frequency network in which multiple base stations transmit the same data simultaneously to a user equipment, UE device, includes a first plurality of base stations transmitting a set of random access parameters of the single frequency network. The method also includes a second plurality of base stations receiving a random access preamble transmitted by the UE device. The second plurality of base stations the same or a subset of the first. The method also includes transmitting responses to the random access preamble from a third plurality of bases stations. The third plurality of base stations the same as or a subset of the second. The method also includes a fourth plurality of base stations receiving a scheduled transmission in response to the responses. The (Continued)

fourth plurality of base stations the same as or a subset of the third.

11 Claims, 2 Drawing Sheets

(51) Int. Cl.
*H04W 56/00* (2009.01)
*H04W 72/12* (2009.01)

(52) U.S. Cl.
CPC ... *H04W 72/1278* (2013.01); *H04W 74/0833* (2013.01); *H04W 74/0841* (2013.01); *H04W 74/0891* (2013.01); *H04W 76/15* (2018.02)

(56) References Cited

U.S. PATENT DOCUMENTS

2018/0098356 A1* 4/2018 Li ................... H04W 72/1278
2018/0235013 A1* 8/2018 Jung ................. H04W 74/006
2020/0092901 A1* 3/2020 Barabell ........... H04W 72/1263

FOREIGN PATENT DOCUMENTS

WO    WO-2013178612 A1    12/2013
WO    WO-2014204365 A1    12/2014

OTHER PUBLICATIONS

Office Action issued by the Japanese Patent Office in Application No. 2018-525715, dated Oct. 21, 2020.

\* cited by examiner

SINGLE FREQUENCY NETWORK RANDOM ACCESS

CROSS-REFERENCE TO RELATED APPLICATIONS

This is the United States national phase of International Patent Application No. PCT/EP2016/078169, filed Nov. 18, 2016, which claims the priority benefit of European Application No. 15195134.0, filed on Nov. 18, 2015. The entire contents of each of the foregoing are incorporated herein by reference.

FIELD OF THE DISCLOSURE

The present invention relates to a mechanism for performing random access to a single frequency network, SFN.

BACKGROUND

In a single frequency network, several base stations transmit data simultaneously by using same resources. These base stations behave as a single frequency network and therefore appear as one single cell to the mobile devices. In addition, base stations can be added to and removed from the set of base stations that are currently transmitting data to a specific mobile device (user equipment, UE) according to UE's movement to cover the area where the UE is expected to move next, i.e. with regard to transmission to a specific UE some cells are switched on and some are switched off according to UE's movement. If there is no need for a base station to transmit to any UE it may also be totally switched off (powered down).

In the context of this invention the term SFN may be understood as a set of synchronously operating base stations that typically cover an area of larger extension, but also as a sub set of base stations from this larger set (so-called SFN Clusters). In order to avoid interference between neighbouring SFN Clusters, resources being used in the respective SFN Clusters may be orthogonal to each other.

The present invention relates primarily to uplink traffic. It is concerned with how to efficiently configure and establish initial connection setup, i.e. the random access procedure for a single frequency network.

Random access procedures are known in the art and vary between radio access technologies. For example in LTE, described in 3GPP TS 36.321, a message flow for random access comprises (1) A UE reads the system information, which is broadcasted by an eNB in each cell. Beside others the following parameters for random access are received:
   available PRACH resources (time slots) for the transmission of the random
   access preamble
   available random access preambles
   initial preamble power
   size of random access response (time) window
(2) After the UE has decided to use the random access procedure, it randomly selects a preamble and a resource from the available preambles and resources
(3) The UE transmits a random access preamble
(4) The eNB that is chosen by the UE to serve it (i.e. the eNB "on which the UE is camping") receives the preamble. Only one eNB can receive the random access preamble, as neighboured eNBs are intentionally using different preambles.
(5) The eNB prepares and transmits a random access response. The transmission timing is flexible but has to be done within the configured random access response window.
(6) After reception of the response, the UE prepares and transmits a scheduled transmission.
(7) After reception of the scheduled transmission, the eNB prepares and transmits a contention resolution message.

CN 102196518 B describes a cell switching procedure including a random access procedure. EP 2 534 873 A2 describes a further random access procedure in an LTE system in particular in connection with minimization of drive test, MDT, measurements.

In US 2013/0089034 A1, a method is described for selecting one out of a plurality of base station to serve a UE in an uplink, UL. A single base station already serving the UE in a downlink, DL, controls the method, which involves by the UE sending reference signals in the UL to multiple base stations. The base stations receive and decrypt the signals and send a received signal strength to the controlling base station for selection of the one base station to serve the UE in UL. The selection is fixed; the selected base station serves the UE.

In a known random access procedure, for example in LTE, the UE has to select a base station before a random access request can be sent. Therefore the UE has to regularly perform cell selection in idle mode to find and select the best-suited base station. These idle mode procedures are power consuming for the mobile device. Furthermore, the receiving quality of a single base station is worse compared to the inventive multiple base station concept (i.e. as offered by an SFN Cluster). The access procedure according to the prior art results in unsuccessful and power wasting transmissions being more likely.

Where multiple base stations build an SFN-like synchronous sub-net, the known conventional random access concepts will fail, as base stations are intentionally disabled to receive random access preambles from neighboured base stations.

WO 2014/204365 A1 describes a method for controlling multiple antenna points by a network node. The network nodes form picocells and accordingly use orthogonal radio resources and do not form a single frequency network in which multiple access points transmit the same signal using the same radio resources.

WO 2013/178612 A1 describes timing advance management in the presence of repeaters and remote radio heads, the remote radio heads being served by an eNB. A UE received signals from multiple radio heads and radio heads for which communications have similar timing advances are assigned to a timing advance group for timing advance management. There is no indication that the radio heads form a single frequency network.

US 2013/0170385 A1 describes a method for contention resolution in a mobile communication system in which a UE receives BCH signals broadcast by two base stations using a multimedia broadcast single frequency network radio transmission format.

GENERAL DESCRIPTION

The present invention provides a method for controlling access to a radio channel in a single frequency network in which multiple base stations transmit the same data simultaneously to a UE device.

The invention also provides a method for a user equipment, UE, device to access a radio channel in a single frequency network in which multiple base stations transmit the same data simultaneously to a UE device.

In a further aspect, the invention provides a UE device, adapted to access a radio channel in a single frequency network in which multiple base stations transmit the same data simultaneously to a UE device.

In still a further aspect, the invention provides a single frequency network radio access, SFN-RA, controller arranged to control a plurality of base stations forming the single frequency network in order that the plurality of base stations each transmit simultaneously.

The invention provides a random access procedure where multiple base stations (eNB) are enabled to receive and respond to a random access preamble. This is advantageous, as due to the multiple receiver/transmitter concept, the likelihood of successful transmission is increased. Therefore, access is faster, battery consumption of the mobile device is reduced and radio resources (for re-transmissions) are saved. In addition the SFN random access concept is advantageous, as the execution of mobility related idle mode procedures can be reduced, i.e. the UE has to read the (random access portion of the) System Information very rarely, as the initial random access configuration remains valid (even when the UE moves) as long as it stays in the respective SFN Cluster.

The invention provides the following benefits.

The SFN-RA controller (a functional entity that may for example be part of the SFN Cluster Management Unit or the Resource Control Unit) is enabled to configure random access relevant parameters commonly for all small cells within a single frequency network (or an SFN Cluster). All base stations within an SFN (or SFN Cluster) are enabled to simultaneously receive a random access preamble. These leading to a more reliable reception of the random access preamble All base stations within an SFN (or SFN Cluster) are enabled to simultaneously respond to a received random access preamble such that the reception of the random access response is more reliable.

All base stations within an SFN (or SFN Cluster) are enabled to forward a received "scheduled transmission" to an SFN-RA controller. The SFN-RA controller is enabled to combine multiple received "scheduled transmissions" and to resolve any conflicting information therein. These provide the advantage of a more reliable reception of the "scheduled transmission".

The SFN-RA controller is enabled to instruct all or a subset of the base stations of the SFN (or SFN Cluster) to simultaneously transmit the "contention resolution" message. The decision which base stations are to transmit this message is made based on reception quality reported by the base stations, e.g. a subset of base stations may be sufficient for a highly reliable collective DL transmission of a message. The base stations are enabled to receive the contention resolution message from the SFN-RA controller and to forward it to the UE by using the resources (time slot and subcarrier) as instructed by the SFN-RA controller. These provide the advantage of a more reliable reception of the "contention resolution" message

BRIEF DESCRIPTION OF THE DRAWINGS

Embodiments of the invention will now be described, by way of example only, with reference to the accompanying drawings in which.

DETAILED DESCRIPTION

Figure 1:
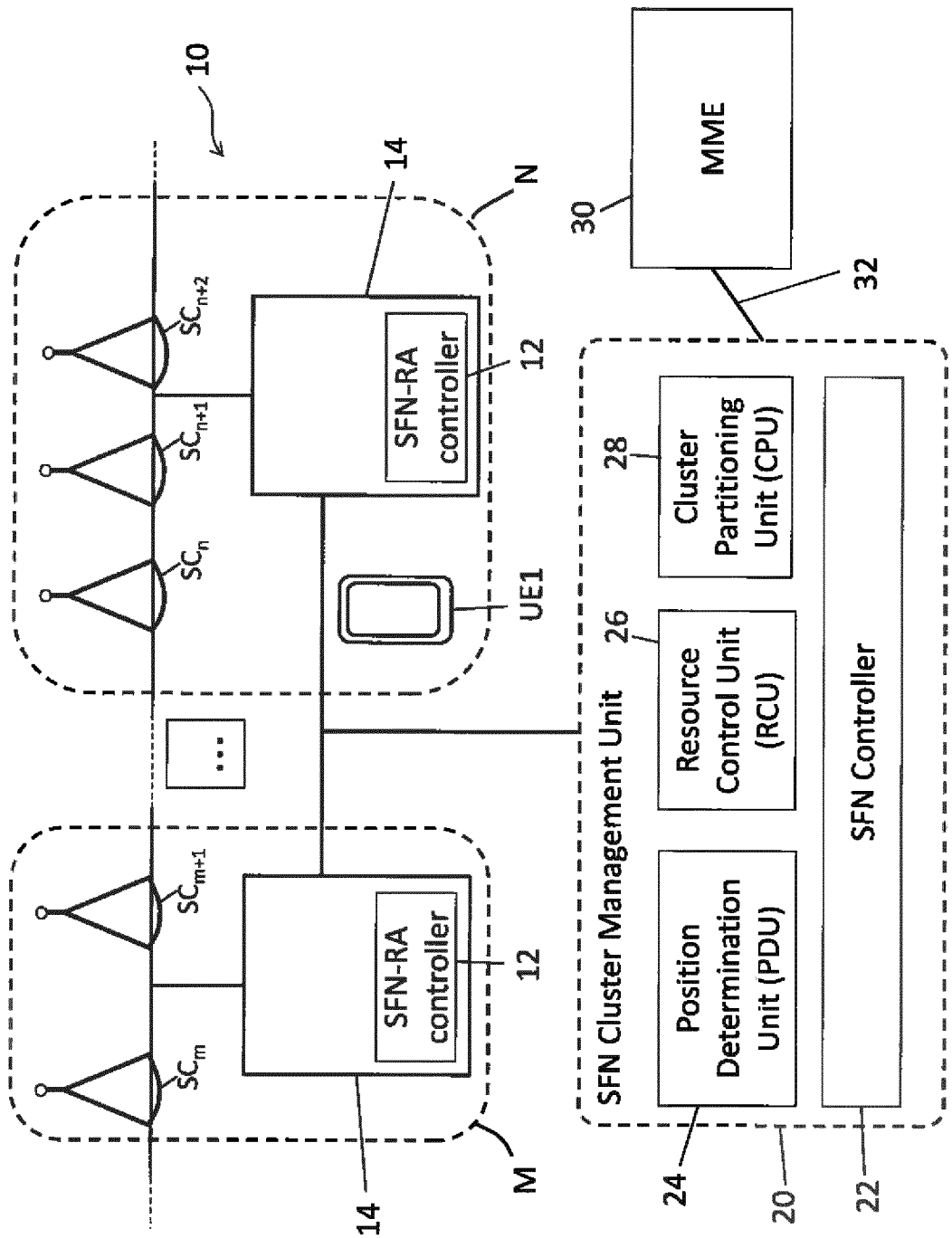
FIG. 1 shows a schematic diagram of a single frequency network.

For illustrating the invention, FIG. 1 shows an exemplary schematic representation of a single frequency network arrangement 10 comprising two clusters, a cluster M and a cluster N. Three small cells SC_n to SC_n+2 are shown configured for the mobile device "UE1" as Single Frequency Network (SFN Cluster N). Two small cells SC_m and SC_m+1 are shown configured to form the second cluster, SFN Cluster M. Each of the small cells SC_n to SC_n+2 and SC_m to SC_m+1 are connected to a SFN random access SFN-RA controller 12 which configures the small cells. As shown in FIG. 1, the SFN-RA controller 12 is part of a cluster specific radio control unit, RCU, 14 which is in turn connected to a single frequency network cluster management unit 20.

As illustrated, the SFN cluster management unit 20 comprises a SFN Controller 22, a position determination unit 24, a central RCU 26 and a cluster partitioning unit 28. The SFN cluster management unit 20 is further in connection with an LTE mobility management entity, MME, 30, here via a S1 interface 32. Rather than having individual SFN-RA controllers attached to each cluster specific RCU, a central SFN-RA controller can be associated with the central RCU 26.

It should be noted that the term "small cell" is used which may, for example be a Node B, NB, evolved Node B, eNB or other forms of base station.

It is a first aspect of the SEN random access procedure, that all base stations of an SFN (or SFN Cluster) use the same random access configuration. Eight parameters (some of which are already used in the known LTE random access procedure) are configured for the base stations by the SFN-RA controller. In contrast to the known procedure, the base stations implementing the SFN random access procedure do not have the freedom to select the parameters on their own (1) available random access resources (time slots) for the transmission of the random access preamble
(2) available set of random access preambles
(3) initial preamble transmit power
(4) size of random access response window
(5) backoff parameter value In addition, the following new parameters are configured by the SFN-RA controller:

(6) requirements to transmit (positive) random access response
(7) timing to transmit the random access response message
(8) timing alignment configuration. The timing alignment is the timing to be used by the UE to transmit signals earlier in order to result in a synchronized reception of signals from different UEs by the base station.

The SFN-RA controller configures the parameters as follows:

Parameters (1) and (2) are selected based on the current capacity need for random access. More time slots and preambles can be made available if more capacity is required. Therefore re-configurations are done if the capacities need changes.

Parameter (3) is selected, so that in most cases the first transmitted preamble can be correctly received. The nominal value of this parameter depends on the size of the cell's coverage area. The concept of multiple reception points is to be taken into account here as our new concept may increase the perceived coverage area significantly.

Parameter (4) is selected based on the capability of the configured set of base stations to respond to all random access requests within this time window.

Parameter (5) indicates a backoff parameter value as used in the random access backoff procedure. With this parameter the base stations may be instructed by the SFN-RA controller to initiate a backoff algorithm in the requesting UEs to delay the next random access preamble transmission attempt(s). The random access process stops when the maximum number of random access preambles has been transmitted in uplink direction without any positive feedback from the base stations.

Parameter (6) indicates in which cases the configured set of base stations sends a positive response to the requesting UE, i.e. a random access response message that will allow the UE to proceed with the "scheduled transmission" message in uplink direction. For example if the preamble is received correctly, if no contention is detected, and if resources on the air interface and on the interface to the core network are free, this will be a valid case to send a positive response.

Parameter (7) indicates which time slot has to be used for transmission of the response message.

Parameter (8) indicates the method to derive the timing alignment value (as described below). In case method 1 is configured, the timing alignment value to be used is included. This is a fixed value used by all base stations.

The SFN-RA controller then transmits (at least one of) the parameters to each base station as a configuration message. All base stations of the same SFN (or SFN Cluster) will obtain the same set of parameters. Base stations from another SFN (or SFN Cluster) will obtain parameters that could be identical or different from the parameters of other SFNs (or SFN Clusters).

After the base stations of SFN Cluster N have received the configuration message from the SFN-RA controller containing some, all or more than the eight parameters as described above, they are implemented. The base stations configure their receiver for the reception of random access preambles and the transmitter for broadcasting the random access parameters, which are relevant for the UEs. Having done so, they are ready to receive any of the available random access preambles at the configured time slots.

In the example arrangement of FIG. 1, the small cells SC_n to SC_n+2 will start to broadcast the random access parameters synchronously as part of a system information broadcast, SIB, i.e. by using same time slots and same subcarriers.

Figure 2:
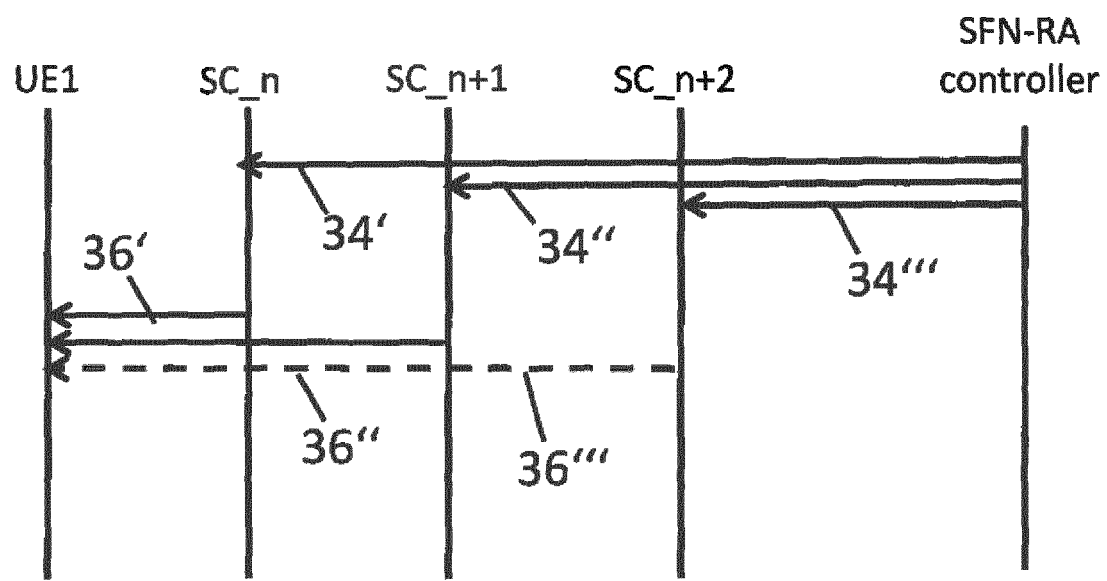
FIG. 2 shows a message exchange between an SFN controller, small cells and a UE.

Referring to FIG. 2, a typical exchange of messages between the SFN-RA controller and the small cells as well as between the small cells and a UE is illustrated. The configuration message from the SFN-RA controller to each of the small cells is shown as messages 34', 34" and 34'". In turn, the small cells broadcast the SIBs illustrated by messages 36', 36" and 36'". Message 36'" is shown as a dotted line to indicate that the parameter is transmitted but will not contribute significantly to a received signal at the UE1 due to a large distance between the small cell and the UE.

Note, that more parameters are required by the UEs for random access as described in 3GPP TS 36.321, which are also broadcast. For the sake of simplicity they are not further described here as they are used as usual for normal random access.

In the LTE random access procedure, the timing alignment value is derived dynamically by a base station based on a reception timing of a random access preamble. This method is not applicable in a SFN, as it typically leads to different timing alignment values for each base station, Synchronous transmission is not possible when the data (i.e the timing alignment value) are different for each base station. This issue is solved by one of the three following methods:

Semi Static Value:

The SFN-RA controller configures the timing alignment value. It selects the value depending on the average distance from any UE in the SFN to the nearest base station, e.g. r/2 where r is the radius of the coverage area. This value is transmitted to the base stations and used in the random access response message. This method is advantageous, as it enables a fast response by the base stations and reduces the amount of signalling.

Dynamic Value with Coordination by SFN-RA Controller:

After reception of the random access preamble by the base station, the time offset delta_T between the received preamble and the downlink timing is calculated. This value is transmitted to the SFN-RA controller. The SFN-RA controller selects one value for the timing alignment based on the multiple received time offsets. For example the timing alignment value is derived by only considering the lowest time offset value. Alternatively, a mean or average offset value could be used to determine the alignment value.

Dynamic Value with Selection by UE:

After reception of the random access preamble by the base station, the time offset delta_T between the received preamble and downlink timing is calculated and used to derive a timing alignment value. Each base station will derive an own value. This value is transmitted to the UE within the random access response message. The transmission is done simultaneously by all base stations. Without further means, the reception of these multiple different messages on same resources will fail. Therefore, orthogonal codes are used, to enable that the different values could be distinguished at the UE. E.g. different orthogonal spreading codes are assigned by the SFN-RA controller to the base stations, which will spread the timing alignment value by using the assigned code. These codes are known in each UE, e.g. they are preconfigured. After reception of the response message by the UE, it will decode the different timing alignment values and will calculate one value to be used for the following transmission. E.g. it uses the lowest value or a mean or average value.

Figure 3:
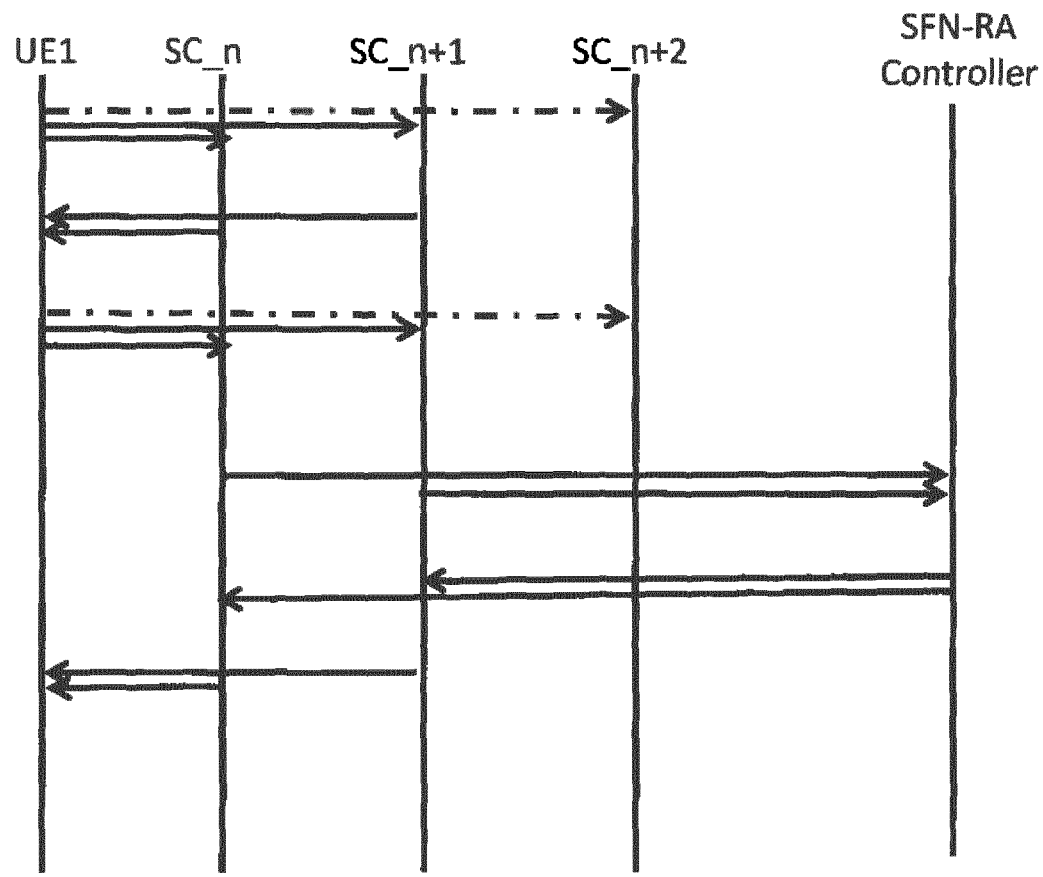
FIG. 3 shows a message exchange including and after a random access preamble transmission.

The random access procedure performed by the UE will now be described with reference to FIG. 3.

As a prerequisite it is assumed that a UE, UE1, has received the UE relevant parameters required for the random access from any (or multiple) base station(s) in the SFN Cluster.

(1) UE1 selects a random access preamble and a time slot from the configured set and transmits the preamble with the configured power. As shown, SC_n and SC_n+1 receive the preamble correctly. SC_n+2 does not receive the preamble (indicated by the doted line) because, for example a large UE-base station separation. SC_n and SC_n+1 decide to send a positive acknowledgement response, as the preconditions of the configured parameter 5 are fulfilled. SC_n and SC_n+1 generate parameters for a response message as instructed by the SFN-RA controller.

(2) SC_n and SC_n+1 send the random access response message synchronously to UE1. They use exactly the time slot for transmission of the response message which has been configured by the SFN-RA controller.

Note: In this step both base stations (e.g., eNBs) have individually generated the same response for this request and they all use the same resources for transmission. Unlike in known random access response transmission the base stations do not have any freedom to choose a transmission timing, the transmission window is just a parameter indicated by the SFN-RA controller to schedule the transmission by the base stations and used by the UEs to stop detecting a response message. This ensures the SFN-like transmission and a timely response to the random access attempt of UE1 that would not be possible when the base stations would coordinate their joint response before transmission. UE1 receives the response message without identifying individual transmission points (base stations SC_n and SC_n+1).

(3) UE1 transmits the scheduled transmission message, which is assumed to be received by SC_n and SC_n+1 in this example.

(4) SC_n and SC_n+1 forward the message to the SFN-RA controller including information about the reception quality (e.g. UL signal strength). The SFN-RA controller combines the possibly multiple received messages while considering the reception quality to prepare a common "contention resolution" message.

(5) The SFN-RA controller selects a set of suitable base stations that should transmit the common "contention resolution" message to UE1. This selection could be based on the reception quality, i.e. only the small cell(s) with highest reception quality is/are selected to transmit the "contention resolution" message. The SFN-RA controller transmits the "contention resolution" message to the selected small cells. In the example of FIG. 3 only SC_n and SC_n+1 were selected. When the "contention resolution" message is exchanged between the SFN-RA controller and the selected base stations, information may be included about the resources to be used by the base stations for transmission of the "contention resolution" message to UE1

(6) SC_n and SC_n+1 transmit the contention resolution message synchronously as instructed by the SFN-RA controller. After successful reception by UE1 the random access procedure is complete.

The multiple reception point concept of the above random access procedure leads to new situations, which have to be handled by the mobile network.

If the scheduled transmission is not correctly received by one or more base stations, the SFN-RA controller will resolve this issue. The base stations forward the received messages and an indicator of the reception quality (or the perceived UL signal strength, or a reliability indication, etc.) to the SFN-RA controller as described above. The SFN-RA controller will then discard messages with low reception quality and will only use messages with good reception quality. In another embodiment, the base station will forward the message with so-called "soft bits". That means, that the base station does not decode the received message to binary bits ("0" or "1"). Instead it forwards only the received symbols to the SFN-RA controller where the actual decoding takes place. The SFN-RA controller will combine the "soft bits" from all base stations while considering the reception quality (or the perceived UL signal strength, or a reliability indication, etc.) of each instance of the received message and will then decode the message. This will lead to the best receiver performance.

Preamble collision may also occur due to transmissions from multiple UEs. The current behaviour of the known random access procedure is the following: In case that two or more UEs are transmitting the same preamble simultaneously (i.e. using the same time slot) to the same base station, all but one requests will be rejected by the base station by transmission of a corresponding "contention resolution" message. The rejected UEs would have to initiate the random access procedure one more time.

The present random access procedure behaves differently. In case that two or more UEs transmit the same preamble simultaneously in the same SFN to different base stations, the base stations will respond with individual messages, so that the UEs will proceed with their individual "scheduled transmission" in the uplink direction. These messages are all forwarded to the SFN-RA controller. The SFN Controller detects that these messages are originating from different UEs (based on the included UE IDs). It will in this case not combine the multiple messages to a single message but will interpret them independently and will assign different resources for each UE to the base stations for the submission of the "contention resolution" message in DL direction. Therefore the inventive method is advantageous as it will lead to lower number of rejected requests and will therefore save radio resources and battery power.

The invention claimed is:

1. A method for controlling access to a radio channel in a single frequency network in which multiple base stations transmit the same data simultaneously to a UE device, the method comprising:
   transmitting from a first plurality of base stations a set of random access parameters common to the first plurality of base stations of the single frequency network;
   receiving by a second plurality of base stations a random access preamble transmitted by the UE device, the second plurality of base stations being the same or a subset of the first plurality of base stations;
   transmitting a plurality of responses to the random access preamble from a third plurality of bases stations of the single frequency network, the third plurality of base stations being the same as or a subset of the second plurality of base stations;
   receiving by a fourth plurality of base stations a scheduled transmission in response to the plurality of responses, the fourth plurality of base stations being the same as or a subset of the third plurality of base stations and forwarding the received scheduled transmission to a single frequency network radio access, SFN-RA, controller together with information about a reception quality of the received scheduled transmission; and
   transmitting synchronously by a fifth plurality of base stations a contention resolution message to the UE device, the fifth plurality of base stations being the same as or a subset of the fourth plurality of base stations, as instructed by the SFN-RA controller, the SFN-RA controller having selected the fifth plurality of base stations (i) based on combining soft bits of the forwarded scheduled transmissions from each of the base stations of the fourth plurality of base stations, with respect to the information about the reception quality, or (ii) based on discarding the forwarded scheduled transmissions with the reception quality lower than a threshold,
   wherein the second plurality of base stations of the single frequency network receiving the random access preamble transmitted by the UE device each determine a time offset between the received preamble and a downlink timing reference to derive a timing alignment value which is passed to the SFN-RA controller, the SFN-RA controller determining a global timing alignment value to be transmitted to the UE device by the second or the third plurality of base stations.

2. The method according to claim 1, wherein the received scheduled transmission is forwarded as received symbols.

3. The method according to claim 1, wherein each of the second or third plurality of base stations of the single frequency network transmits a respective timing alignment value to the UE device in response to the received random access preamble and wherein the UE device determines one value from received ones of the timing alignment values.

4. A single frequency network radio access, SFN-RA, controller arranged to:
control a first plurality of base stations forming a single frequency network in order that the first plurality of base stations each transmit simultaneously a set of random access parameters common to the plurality of base stations, the set of random access parameters being configured by the SFN-RA controller,
receive from a second plurality of base stations a random access preamble transmitted by a UE device, the second plurality of base stations being the same or a subset of the first plurality of base stations,
control a selected third plurality of base stations to transmit simultaneously a response to a random access preamble received by the plurality of base stations, the third plurality of base stations being the same as or a subset of the second plurality of base stations,
receive from a fourth plurality of base stations a scheduled transmission in response to the transmission of the response by the third plurality of base stations, the fourth plurality of base stations being the same as or a subset of the third plurality of base stations the received scheduled transmission being received together with information about a reception quality of the received scheduled transmission, and
control a fifth plurality of base stations to transmit synchronously a contention resolution message to the UE device, selecting the fifth plurality of base stations being the same as or a subset of the fourth plurality of base stations (i) based on combining soft bits of the forwarded scheduled transmissions from each of the base stations of the fourth plurality of base stations, with respect to the information about the reception quality, or (ii) based on discarding the forwarded scheduled transmissions with the reception quality lower than a threshold, wherein the SFN-RA controller further arranged to receive, from each of the second plurality of base stations of the single frequency network receiving the random access preamble transmitted by the UE device, a time offset between the received preamble and a downlink timing reference to derive a timing alignment value, determining a global timing alignment value to be transmitted to the UE device by the second or the third plurality of base stations.

5. The SFN-RA controller according to claim 4, wherein the SFN-RA controller is adapted to determine whether the plurality of received scheduled transmission messages originate from a plurality of user equipment devices, in which case the received scheduled transmission messages are processed according to the user equipment device originating each received scheduled transmission message.

6. The method according to claim 1, wherein the SFN-RA controller generates a contention resolution message from the plurality of messages received from the base stations.

7. The method according to claim 6, wherein the contention resolution message is exchanged between the SFN-RA controller and selected base stations of the single frequency network.

8. The method according to claim 7, wherein the selected base stations transmit the contention resolution message simultaneously to the UE device.

9. The method according to claim 8, wherein the received scheduled transmission is forwarded as received symbols.

10. The method according to claim 1, wherein the second plurality of base stations of the single frequency network receiving the random access preamble transmitted by the UE device each determine the time offset between the received preamble and the downlink timing reference to derive the timing alignment value which is passed to a single frequency network radio access, SFN-RA, controller, the SFN-RA controller determining the global timing alignment value to be transmitted to the UE device by the plurality of base stations.

11. The method according to claim 1, wherein each of the second or third plurality of base stations of the single frequency network transmits a respective timing alignment value to the UE device in response to a received random access preamble and wherein the UE device determines one value from received ones of the timing alignment values.

* * * * *